United States Patent [19]

Kathrein et al.

[11] Patent Number: 5,895,547
[45] Date of Patent: Apr. 20, 1999

[54] LAMINATE PROCESS AND APPARATUS

[75] Inventors: Donald H. Kathrein, Northbrook; Victor A. Tyler, Jr., Lincolnwood, both of Ill.

[73] Assignee: TC Manufacturing Co., Inc., Evanston, Ill.

[21] Appl. No.: 08/812,241

[22] Filed: Mar. 6, 1997

[51] Int. Cl.⁶ ................................................. B29C 47/06
[52] U.S. Cl. ........................................ 156/324; 156/244.27
[58] Field of Search ............................ 428/41.8, 343, 428/353, 906; 156/244.27, 244.11, 324, 289

[56] References Cited

U.S. PATENT DOCUMENTS

| | | | |
|---|---|---|---|
| 4,242,402 | 12/1980 | Korpman | 156/244.27 |
| 4,379,806 | 4/1983 | Korpman | 156/244.11 |
| 4,888,075 | 12/1989 | Freedman | 156/243 |
| 5,298,325 | 3/1994 | Culbertson | 428/336 |
| 5,516,584 | 5/1996 | Blitstein et al. | 428/359 |
| 5,720,834 | 2/1998 | Steele | 156/187 |

*Primary Examiner*—Daniel Stemmer
*Attorney, Agent, or Firm*—Lee, Mann, Smith, McWilliams, Sweeney & Ohlson

[57] ABSTRACT

A method and apparatus providing a process of laminating tape with a thin integral primer to a release liner. The apparatus of the present invention comprises multiple extrusion dies and adjustable driven rollers having an arrangement that supplies a stream of molten adhesive and a separate stream of primer that is laminated between a film of base material and a release liner, which is laminated between cooled rollers to form a tape.

3 Claims, 1 Drawing Sheet

1

LAMINATE PROCESS AND APPARATUS

FIELD OF THE INVENTION

The present invention relates generally to the manufacturing of tape with an integral primer. More specifically, the invention relates to a method and apparatus for laminating adhesive tapes with an integral primer, and to tape manufactured by this method.

BACKGROUND OF THE INVENTION

Most conventional tapes for heavy industrial or commercial use have been manufactured using a calendering process wherein multiple layers (adhesive, base material, and release liner) are pressed together to form a laminated tape. The calendering process uses multiple rollers to press the bulk materials into sheets and then laminate them into a composite. This process is not conducive to applying a thin coating of substantially solids primer into the laminate between the adhesive and the release liner. Tapes with a integral primer are useful in numerous applications, including wrapping pipelines, maritime use, construction, and roofing applications. However, such tapes are more difficult to manufacture than standard commercial tape.

Other methods were examined that proved less successful than the present method. Spraying the substantially solids primer directly onto the adhesive after the base material and adhesive had been laminated was unworkable due to the high viscosity of the substantially solids primer. Applying a thin coating of substantially solids primer onto the laminate using a roller coating was unworkable because the primer has an aggressive tack that would not allow the primer to release from the coating roll to the laminate, even when the primer was heated. Coextruding multiple layers (base material, adhesive, and substantially solids primer) while laminating a release liner also had difficulties due to the high viscosity and aggressive tack of the primer.

Therefore, another method and apparatus had to be developed to manufacture tape with an integral primer.

SUMMARY OF THE INVENTION

It is an object of this invention to provide a method and apparatus that overcomes the disadvantages of the prior methods as described above. It is specifically contemplated that the method of this invention will overcome the disadvantages recited herein with respect to the high viscosity and aggressive tack of the primer while providing a commercially useful method of manufacturing a tape with an integral primer.

In broad terms, the method and apparatus of this invention provide a process of laminating a release liner and tape with a thin integral primer. The apparatus of the present invention comprises multiple extrusion dies and driven rollers having an arrangement that supplies a stream of molten adhesive and a separate stream of primer that is laminated between a film of base material and a release liner, which is laminated between cooled rollers. It contemplates using standard accumulators and material feed sources. The apparatus further includes a means for providing continuous flows of molten adhesive and primer by including pressurized pipelines to deliver the adhesive and primer to the respective dies. The apparatus still further includes separate electronically-controlled drives for the rollers that provide differential speeds to the feed rollers and cooled pinch rollers so that the lamination occurs with minimal residual stress in the finished, cooled laminate tape. The rollers are further controlled in terms of temperature, pressure, thickness, and tension. The invention results in an adhesive tape that is unstressed and relatively wrinkle free. The method and apparatus can be effectively used for producing high quality tapes that contain a thin layer of integral primer. Such tapes do not require separate primers to be used during the application of the tape.

The apparatus and method of this invention can be used to manufacture the Primerless Pipeline Coating Tape as described in U.S. Pat. No. 5,516,584. It is also contemplated that the apparatus and method can used in manufacturing roofing materials, marine wraps, construction materials, and highway repair tapes, as well as other tapes with integral primers as may be found useful in the future. Such tapes produced by this method may reduce the harmful environmental effects of using primers and may drastically decrease the time for applying tapes by eliminating the application of a primer or waiting for the primer to set.

BRIEF DESCRIPTION OF THE DRAWINGS

The above mentioned and other features of this invention and the manner of obtaining them will become more apparent and the invention itself will be best understood by reference to the following description of an embodiment of the invention taken in conjunction with the accompanying drawings in which.

DESCRIPTION OF THE PREFERRED EMBODIMENT

Figure 1:
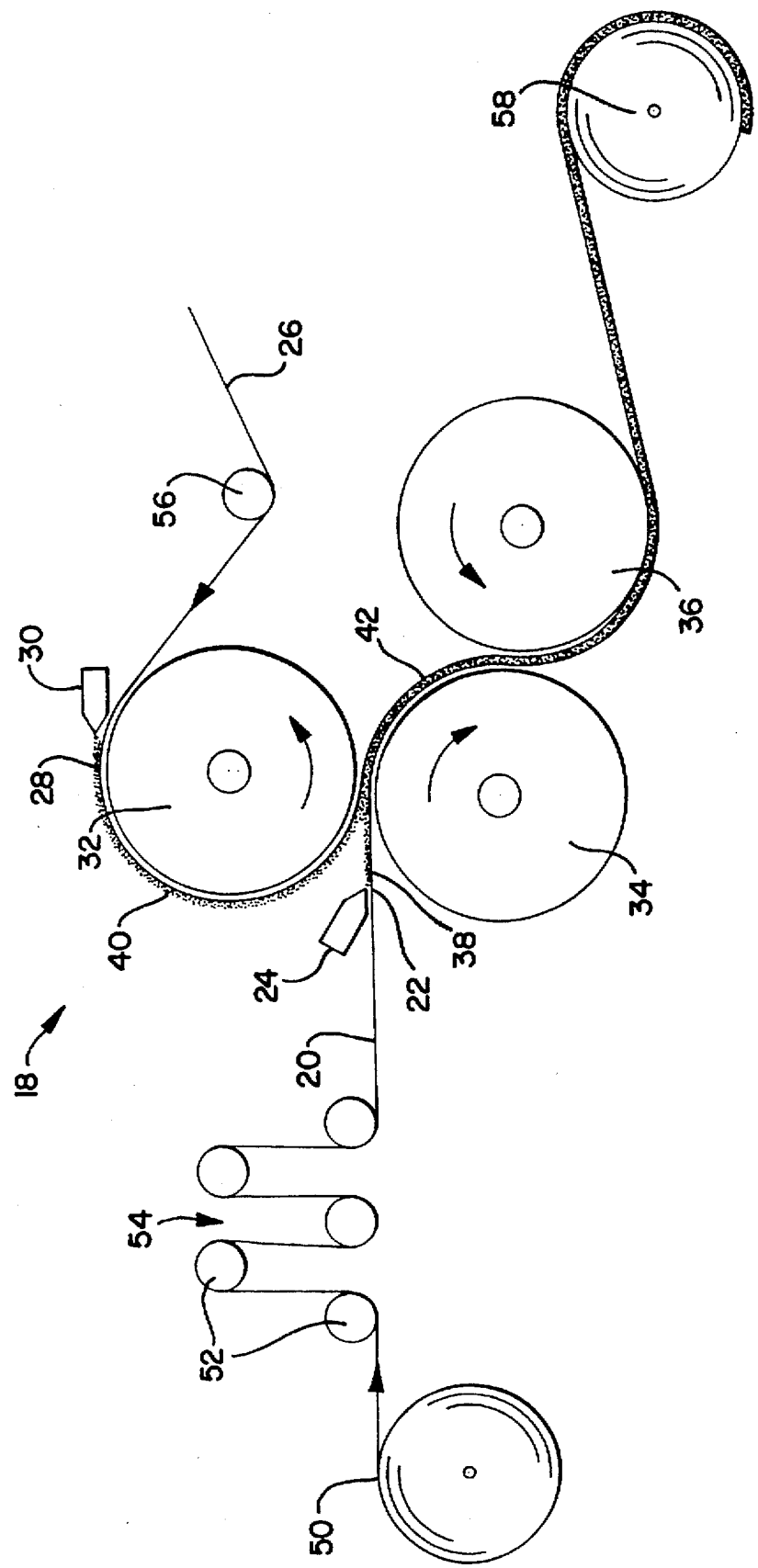
FIG. 1 is a schematic view showing the process of making tape.

Referring to FIG. 1, a process is shown for laminating tape with a thin integral primer. The method of making tape includes conveying a base material 20 and applying an adhesive 22 on the top side the base material 20 with an adhesive extrusion die 24. The base material 20 may include bituminous materials, a wide range of plastics, and woven fabric, such as cloth. Adhesive 22 may include standard materials with adhesive qualities as plentiful in the art.

Next, a release liner 26 is applied with a primer 28 by means of a primer extrusion die 30. The primer 28 is surface receptive with an aggressive tack. An example of such a primer is disclosed in U.S. Pat. No. 5,516,584, which is owned by a common assignee as the present invention and is incorporated herein by reference. The release liner can be a variety of material that do not stick to the adhesive and have release characteristics, such as a silicon coated paper or plastic, such as a polypropylene.

The release liner 26 coated with primer 28 is rotated around a portion of liner assist roller 32. The base material 20 with adhesive 22 is aligned and laminated with the release liner 26 coated with primer 28 between liner assist roller 32 and roller 34 so that the adhesive coated side 38 and the primer coated side 40 are directed inward and between the base material 20 and the release liner 26. The resulting combination 42 is directed through two pinch rollers 34 and 36. It should be apparent that this method is part of a larger process that must include mixing adhesive and primer and pumping them to the extrusion dies. The rollers are independently electronically controlled.

The apparatus 18 of this invention, as schematically shown in FIG. 1, contains a base material supply source 50 to provide the base material 20. Source 50 is preferably a roll; however, other sources are plentiful. The base material 20 may be formed and rolled until it is ready for the production of tape, or it may come directly from a fabricator.

The base material 20 may proceed through a series of control cylinders. Preferably, the control cylinders 52 are arranged into an accumulator 54. Accumulators 54 as known in the art take up slack in the base material 20 and allow for changing of supply source rolls. As the base material 20 proceeds, an adhesive extrusion die 24 allows for the application of an adhesive 22. The selection of an extrusion die is not critical to this invention. Numerous die means are known including single and twin screw extruders, off-batch extruders, and the like. Multi-manifold dies are also an option. The adhesive extrusion die 24 is connected to a pressurized pipeline or tubing through which the molten adhesive is pumped (not shown).

A release liner 26 is introduced from a source and preferably through an accumulator (not shown). Preferably, the liner 26 is properly directed by a control cylinder 56 that directs the release liner 26 to a liner assist roller 32. A primer extrusion die 30 applies a primer 28 to the release liner 26. A release liner overcomes the manufacturing and rolling concerns caused by the tackiness of the primer 28. The release liner 26 contacts the rollers and is guided through the roll stack (Rollers 32, 34, and 36) so that the primer 28 does not contact the roll stack during the manufacturing process. The primer extrusion die 30 is attached to an integral primer mixer (not shown) through pressurized pipelines/tubing and pumps (also not shown) as necessary to provide a primer 28 in the appropriate manner.

The liner assist roller 32 operates in conjunction with a roller 34 to laminate the base material 20 with the release liner 26 with the primer 28 and the adhesive 22 in between. Rollers 32 and 34 may operate as chill rollers. The combination 42 passes through pinch rollers 34 and 36. Rollers 32, 34, and 36 (the roller stack) are independently electronically controlled so that speed and temperature of each roller is independently set. Also, the rollers 32, 34, and 36 are adjustable so that tension, pressure, and thickness are controlled.

The resulting tape may pass through a double unwind feed turret that is known in the art (not shown) and wrap on a product roll 58.

The apparatus 18 preferably includes adjustable, electronically-controlled drives for the roll and rollers that provide differential speeds to the feed rolls and the roller stack so that the lamination occurs with minimal residual stress in the finished, cooled laminated tape. A slight differential in speed, possible due to independent drives, has been found useful. The sheer may be controlled and adjusted to produce the desired tape and take into account the thickness and properties of the materials. Also, the temperature or chilling of the rollers can be controlled. Finally, the distance between rollers of the roll stack is adjustable to accommodate or to form tape of the desired thickness. The result is an adhesive tape that is unstressed and relatively wrinkle free, which may contain a thin layer of integral primer, to replace tapes that require separate primers during application of the tape.

While in the foregoing specification this invention has been described in relation to a preferred embodiment thereof. It will be apparent to those skilled in the art that the invention is susceptible to additional embodiments and that certain of the details described herein can be varied considerably without departing from the basic principals of the invention.

What is claimed is:

1. A method of manufacturing tape with integral primer that comprises the steps of:

conveying a base material toward a roll stack;

applying an adhesive on one side of the base material;

conveying a release liner toward the roll stack;

applying a primer on the release liner;

aligning the coated base material and coated release liner; and laminating the base material and release liner between rollers of the roll stack, thereby forming a tape including the base material, the adhesive, the release liner, and the integral primer.

2. The method of claim 1 further comprising the step of: feeding the laminate through pinch rollers.

3. The method of claim 2 wherein rollers in the roll stack are independently electronically controlled.

* * * * *